United States Patent [19]

Esthimer

[11] Patent Number: 4,906,213

[45] Date of Patent: Mar. 6, 1990

[54] APPARATUS FOR DETECTING THE PITCH OF A MARINE CONTROLLABLE PITCH PROPELLER

[75] Inventor: William F. Esthimer, Walpole, Mass.

[73] Assignee: Bird-Johnson Company, Walpole, Mass.

[21] Appl. No.: 339,725

[22] Filed: Apr. 18, 1989

[51] Int. Cl.[4] ............................................. B63H 3/00
[52] U.S. Cl. ........................................ 440/50; 416/27; 416/157 R; 440/86
[58] Field of Search ................... 440/49, 50, 75, 84, 440/86; 416/25, 27, 147, 156, 157 R

[56] References Cited

U.S. PATENT DOCUMENTS

| | | | |
|---|---|---|---|
| 2,342,665 | 2/1944 | Hammond et al. | 440/50 |
| 2,360,982 | 10/1944 | Sahle . | |
| 2,931,443 | 4/1960 | Pehrsson | 440/50 |
| 3,302,724 | 2/1967 | Brooks et al. | 416/27 |
| 3,693,575 | 9/1972 | Mades | 440/50 |
| 3,788,768 | 1/1974 | Prampart | 416/157 R |
| 3,895,598 | 7/1975 | Blickle | 440/50 |
| 4,028,004 | 6/1977 | Wind . | |
| 4,142,829 | 3/1979 | Inoue et al. | 416/25 |
| 4,533,295 | 8/1985 | Duchesneau | 416/27 |
| 4,639,192 | 1/1987 | Harrell | 416/27 |
| 4,648,797 | 3/1987 | Martin | 416/27 |

FOREIGN PATENT DOCUMENTS 860205 2/1961 United Kingdom .

OTHER PUBLICATIONS

"MCRT® 16-SG & MCRT® 26-SG Strain Gage Service Rotary Transformers" Brochure of S. Himmelstein and Company, Hoffman Estates, IL, 1985.
"Linear Displacement Transducer Series BLT", Brochure of Balluff Inc., Florence, Ky.—before May, 1988.
May, E. R., "The Control of Naval Controllable Pitch Propellers;" Sixth Ship Control Systems Symposium, Oct., 1981.
"Controllable Pitch Propeller," Brochure of Bird-Johnson Company, Walpol, Mass.—before May, 1988.

Primary Examiner—Sherman D. Basinger
Assistant Examiner—Stephen P. Avila
Attorney, Agent, or Firm—Brumbaugh, Graves, Donohue & Raymond

[57] ABSTRACT

The pitch of a marine controllable pitch propeller is detected by a motion/DC current transducer in the propeller hub. Circuitry rotating with the propeller shaft converts an AC power signal to DC for energization of the transducer and converts a DC output signal from the transducer to AC. The AC power and output signals are transferred from the rotating circuit to a stationary circuit in the vessel hull by rotary transformers. There are no contacts between relatively moving parts of the transducer or rotary transformers, thus ensuring long life for the pitch detection system.

8 Claims, 4 Drawing Sheets

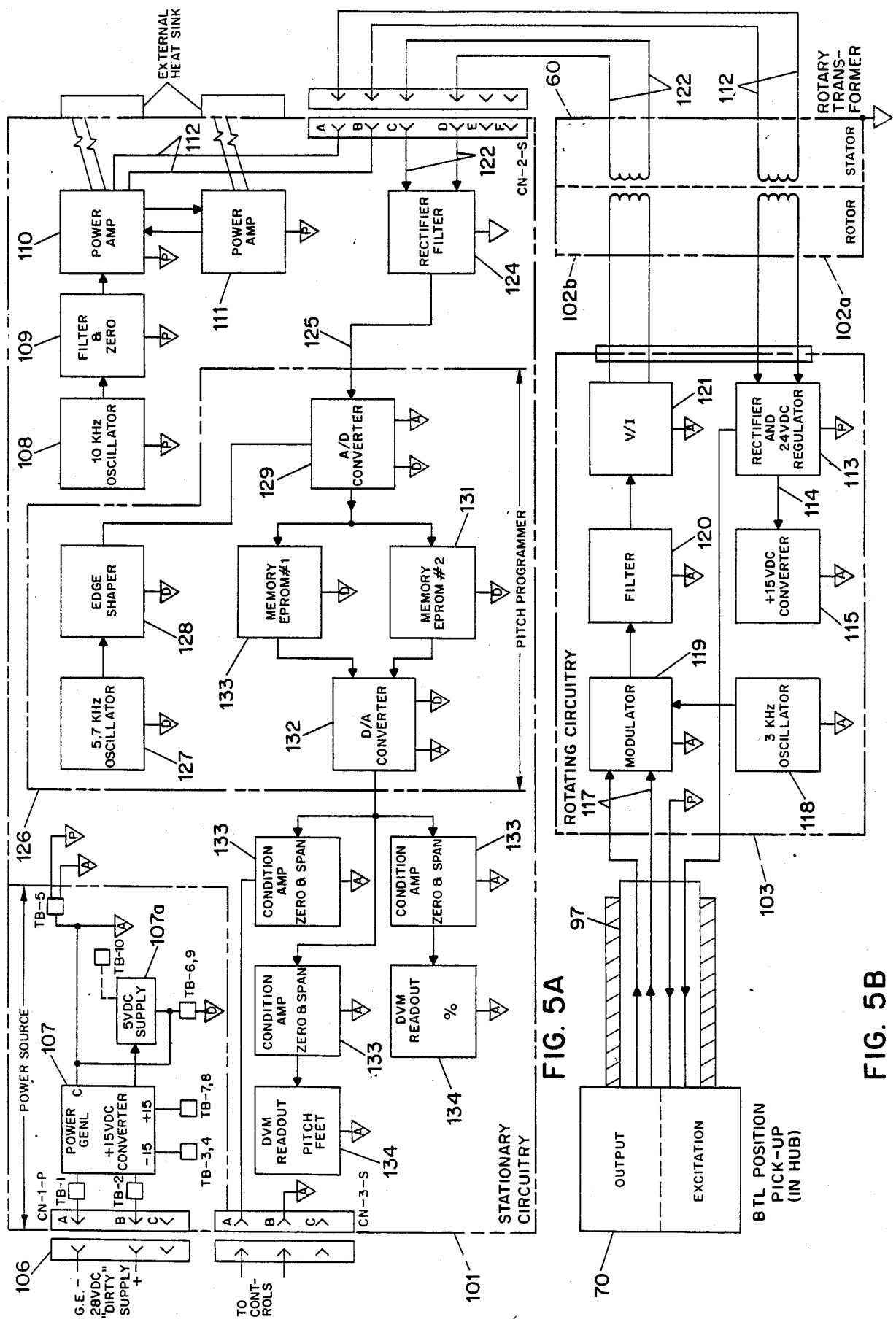

APPARATUS FOR DETECTING THE PITCH OF A MARINE CONTROLLABLE PITCH PROPELLER

BACKGROUND OF THE INVENTION

For optimum performance and efficiency of a marine controllable pitch propeller ("CPP") it is necessary to control the pitch as accurately as possible. Most control systems for CPP's rely on the physical fore-and-aft position of a part of a translating member of the pitch control mechanism that is within the vessel hull to obtain an indication of the propeller pitch.

There are various designs of CPP's in common use. For example, one design employed by manufacturers of CPP's for many years consists of a hub and blade assembly in which the pitch is controlled by a hydraulic piston and crosshead assembly in the hub. The piston drives a crosshead in a fore-and aft direction which, in turn, pivots the blades by rotating the blade mounts through an arc by means of an eccentric pin/sliding block/slot arrangement or, in a variation of this design, by means of a system of mechanical links connecting the crosshead and blade mounts. The piston movement is controlled by a directional actuating valve, the valve body of which is affixed to the piston-crosshead assembly and the spool of which is affixed to the aft end of an oil transmitting tube (also commonly called the "valve rod"). The valve rod extends forwardly within the propeller shaft into the hull of the vessel and to a device usually referred to as the "oil distribution box" or "O.D. box." The O.D. box includes rotary seals and oil passages for transmitting the hydraulic actuating oil to and from the hydraulic piston in the hub through the rotating propeller shaft and the rotating/translating valve rod.

The O.D. box also includes an actuating device, usually a hydraulic servomotor, that moves the valve rod, and hence the valve spool, fore and aft in response to control signals from the remote control apparatus of the CPP system. The directional actuating valve directs hydraulic actuating oil to the selected side of the piston, and the piston-crosshead assembly translates in the desired direction to effect a pitch change of the blades. When the valve rod has been moved by the actuating device in the O.D. box to a position such as to establish the desired propeller pitch, the movement of the valve rod is stopped. The piston-crosshead assembly continues moving a small distance until the valve spool is centered in the valve body, at which point the flow of oil to the piston and movement of the piston/crosshead assembly are stopped.

The valve rod translates with the piston and crosshead assembly. The fore-and-aft position of the inboard end of the valve rod provides, therefore, an indication of the position of the piston-crosshead assembly in the hub and thereby of the pitch of the blades. Pitch indication is provided in most systems by means of a pointer attached to the forward end of the valve rod and a pitch scale attached to the oil distribution box. In addition most systems have a device associated with the forward end of the valve rod for generating a pneumatic or electrical signal used for remote indication of the pitch-setting and as a feedback signal for processing in the control system to maintain a desired pitch.

The oil distribution box can be located either in the shaft line or forward of the reduction gear box at the forward end of the shaftline. The pitch-indicating scale and the stationary parts of the remote-signalling device are usually affixed to the oil distribution box and, in effect, also affixed to the hull (via the shaftline and thrust bearing for O.D. boxes located in the shaftline and via the reduction gear casing for O.D. boxes located on the reduction gear casing). The thrust bearing is in the shaftline and is, therefore, located aft of the O.D. box for O.D. boxes mounted on the reduction gear box at the forward end of the shaftline and can be located either forward or aft of the O.D. box for shaft-mounted O.D. boxes. The pointer of the pitch-indicating scale is affixed to the valve rod, and the movable parts of the remote-signalling device are coupled to the valve rod. The propeller is, of course, located outboard at the aft end of the propeller shaft. In some ships the distance between the pitch-indicating scale and remote-signalling device and the propeller is more than 300 feet.

Inaccuracies in the pitch-indication system result from the fact that both the valve rod and the propeller shaft are subject to changes in length due to changes in propeller load, hydraulic oil pressure, and oil, sea, and air temperatures. With installations where the O.D. box is located on the reduction gear casing, additional inaccuracies result from the displacement of the propeller/valve rod/hub assembly with respect to the pitch scale and remote-signalling device due to thrust bearing manufacturing clearances and normally permitted thrust bearing wear-down limits. Inaccuracies due to changes in shaft and valve rod length caused by steady-state loads and thrust bearing wear-down are predicable and can, to some extent, be compensated for in the designs of the scale and the remote-signalling and processing system. However, inaccuracies due to temperature changes and to transient load changes, such as those associated with vessel speed changes in magnitude and/or direction, cannot be readily designed into the scale or readily compensated for in the control system logic.

Changes in temperature are not easily dealt with. One can imagine sensing the water temperature as indicative of the actual shaft and valve rod temperatures and repositioning the scale (or pointer) to adjust for changes in length due to such temperature changes. Such an approach, however, is complicated and only partly solves the problem, because the lengths of the shaft and the valve rod are affected by temperature conditions other than the water temperature, such as the temperature of the oil supplied to the hub for positioning the piston/crosshead as well as the ambient air temperature around the part of the shaft within the hull.

Inaccuracies in indicated and detected pitch similar to those described above are present in other types of CPP systems. In CPP systems in which the actuating valve for the hydraulic piston in the hub is within the vessel (either inside or outside the shaft), the translatable oil supply tube and propeller shaft, with which the pitch-indicating and pitch-detecting devices are associated, are subject to the variations in length described above. So also are the pitch-indicating and pitch-detecting devices of force-rod type CPP systems subject to inaccuracies resulting from changes in the lengths of the shaft and force rod due to load and temperature variations that are not easily compensated for.

In summary the conditions that affect the inaccuracy of inboard pitch indication by detection of the position of an inboard part of a valve rod, oil supply tube or force rod relative to a scale affixed, in effect, to the hull vary considerably, and monitoring such conditions and compensating for them in the pitch detection and control system would introduce complications, increase costs and be only partly successful in eliminating inaccuracies. The actual pitch-setting of the propeller is represented accurately by the fore-and-aft position of the aft end of the valve rod relative to the propeller hub (except for a small and normally acceptable inaccuracy due to variations in valve spool centering location). The inaccuracies in propeller pitch indicated by the scale and signalled by the remote-signalling device result from the variations described above in the lengths of the shaft and the valve rod between the hub and the components of the scale and the remote-signalling device.

Consideration has often been given to providing a device within the propeller hub to detect the position of the valve rod (or oil tube or force rod), crosshead or other translating member of the pitch control mechanism. Prior suggestions for such a device have been rejected for various reasons. One important reason is the hostile and inaccessible environment of the detecting device. The hub usually contains oil or grease, which rules out optical detectors and can cause problems for electrical detector devices. The hub and blade assembly is subject to vibration and shock that can cause failure of the device. If the device fails, replacement is difficult at best and would almost certainly have to be done in port. If the detecting device has contacting, relatively moving parts (e.g., a potentiometer), wear inevitably will produce failure and necessitate replacement. Another reason is the complication of transmitting reliably information indicative of the detected position of the translating member from a detecting device in the hub into the vessel.

SUMMARY OF THE INVENTION

One object of the present invention is to provide a pitch measurement apparatus that is substantially free of inaccuracies resulting from changes in length due to changes in temperature and load conditions of the propeller shaft and the valve rod (or its equivalent). Another object is to provide a pitch measurement apparatus in which there is no mechanical contact between parts that move relative to each other, i.e., in which failure due to wear is virtually excluded. A further object is to provide a pitch measurement signal that is highly accurate and readily processed for use in providing both readout and control.

The foregoing objects are attained, according to the present invention, by apparatus for detecting the pitch of a marine controllable pitch propeller system that includes a rotatable propeller shaft extending from within a vessel hull to a location outboard of the hull, a hub and blade assembly affixed to the shaft at said outboard location and having a plurality of blades mounted on a hub to pivot about axes disposed generally radially of the propeller shaft axis, and a pitch-control apparatus that includes a translating member in the hub and coupled to the blades for changing the pitch settings of the blades in response to fore-and-aft movements of the translating member. The apparatus of the present invention comprises a stationary circuit in the vessel hull for generating a first AC signal and a first rotary electrical transformer in the vessel hull having a stationary winding connected to the stationary circuit for receiving the first AC signal and a rotating winding rotatable with the propeller shaft for receiving the first AC signal from the rotating winding, thereby to transfer the AC signal with no physical contact between relatively movable components. A first rotating circuit rotatable with the propeller shaft converts the first AC signal to a first DC signal. A linear displacement transducer received in the propeller hub and connected to the first circuit for energization thereby detects the fore-and-aft position of the translating member without any physical contacts between relatively moving components of the transducer and converts the first DC signal to a second DC signal indicative of the position of the translating member. A second rotating circuit rotatable with the shaft and connected to the transducer to receive the second DC signal converts the second DC signal to a second AC signal. A second rotary electrical transformer within the vessel hull includes a rotating winding that is rotatable with the propeller shaft and connected to the second rotating circuit to receive the second AC signal and a stationary winding for receiving the second AC signal from the rotating winding without any physical contacts of relatively moving components. A second stationary circuit in the vessel hull is connected to the stationary winding of the second transformer to receive the second AC signal, process the second AC signal and produce readout and control signals indicative of the pitch-setting of the hub and blade.

It is preferred to use a linear displacement transducer of a type that includes a stationary component affixed to the propeller hub and a movable component affixed to the translating member, the stationary component including an electrical conductor and a magnetostrictive waveguide and the movable component including permanent magnets adapted to generate a magnetic field for propagating magnetostrictively a mechanical pulse along the rod induced by a current pulse generated by the circuitry of the stationary component energized by the first DC signal. Advantageously, the first and second rotary transformers are components of a unitary two-channel rotary transformer.

In preferred embodiments a rigid conduit runs within the propeller shaft aftward from a location within the vessel hull forward of a forward terminus of the shaft to a location within the propeller hub, the conduit being rotatable with the propeller shaft but axially stationary. The rotary transformers and the rotating circuits are affixed to the conduit forward of the forward terminus of the propeller shaft. Electrical conductors adapted to conduct the first and second DC signals between the transducer and the respective rotating circuits extend through the conduit. The rotating circuits are contained in a housing affixed to the outside of the conduit forward of the forward terminus of the propeller shaft. Preferably, the housing has substantially planar fore-and-aft faces and a circular cylindrical peripheral wall concentric to the axis of rotation of the conduit so that no projections that could strike an object or a person are presented by the housing.

The stationary component of the transducer may be contained in a compartment formed in an aft wall portion of the hub, the waveguide extending forwardly from the compartment through a sealed opening. The compartment may have an external access opening in the hub aft wall portion covered by a removable sealed cover, thereby facilitating installation and permitting repair or replacement of the transducer without disassembling the hub.

An important advantage of the present invention is the complete lack of any physical contacts between relatively moving components, thus obviating one of the principal deterrents to the use of hub-mounted detector devices. The invention requires only a few modifications of existing CPP systems. The magnetostrictive transducer, which is preferred for the invention, is highly accurate and produces readout and control signals indicative of the propeller pitch that are more accurate than have heretofore been possible.

For a better understanding of the invention, reference may be made to the following description of an exemplary embodiment, taken in conjunction with the accompanying drawings.

DESCRIPTION OF THE DRAWINGS

FIG. 5 is a circuit diagram of the embodiment.

DESCRIPTION OF THE EMBODIMENT

Figure 1:
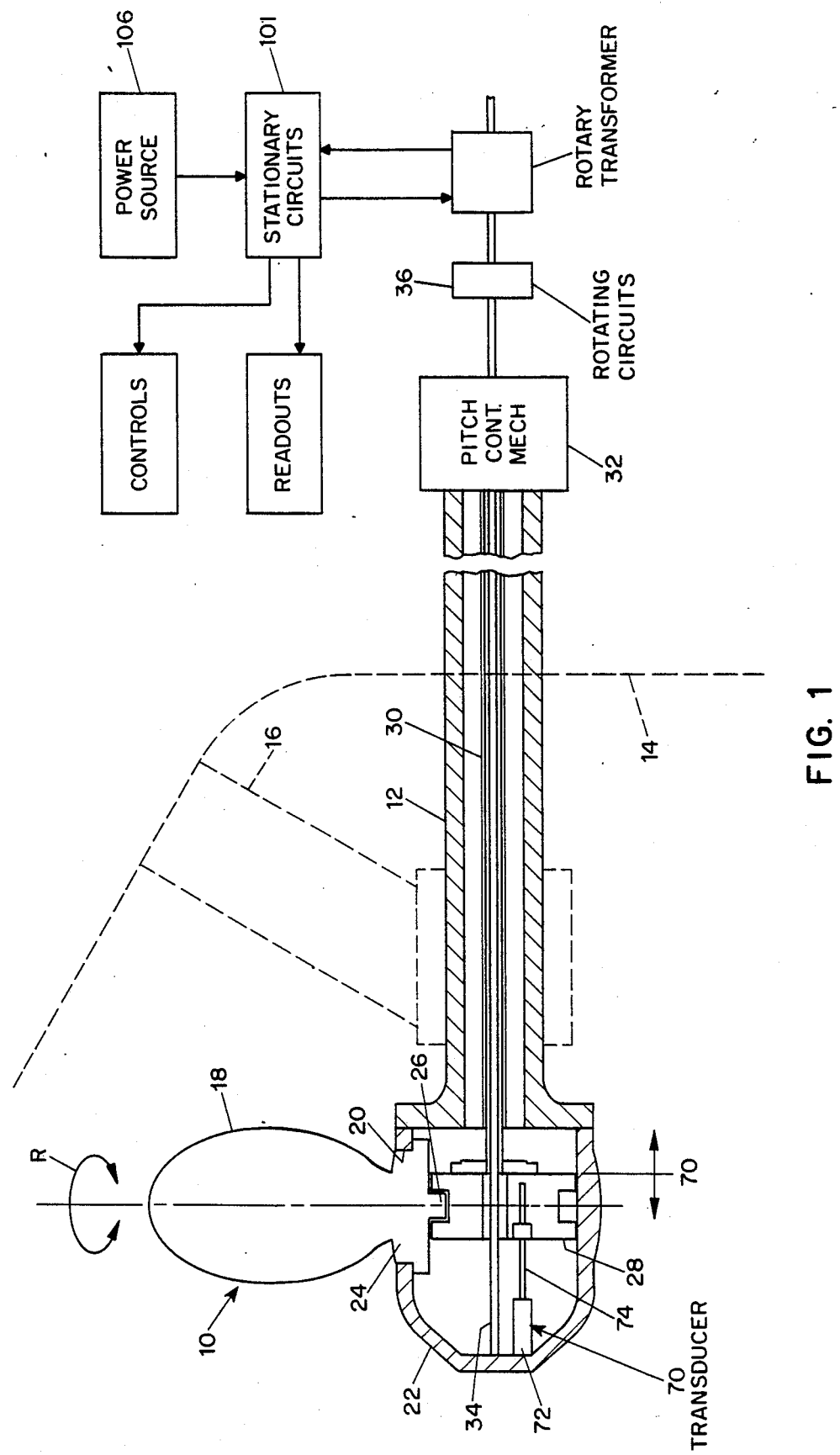
FIG. 1 is a combined schematic illustration and block diagram of the embodiment.

Reference numeral 10 designates generally the hub and blade assembly of a CPP system. The assembly 10 is depicted schematically, inasmuch as various designs for such assemblies are well known and the present invention is not limited to any particular designs of Cpp's—on the contrary the present invention is useful in all types and designs of CPP's.

The hub and blade assembly 10 is affixed to the aft end of a propeller shaft 12. The dashed lines represent the ship's hull 14 and a support 16 carrying the aftmost shaft bearing. The propeller blades 18 (only one is shown but there are, of course, normally two or more) are mounted in ports 20 in the hub 22 on crank rings 24 (with which they may be integral or to which they may be attached by bolts). An eccentric crank pin 26 on the crank ring 24 is coupled by a slide block (not shown) to a crosshead 28 that is movable fore-and-aft in the hub, thereby to rotate the blades in their mounts (arrow R) to change the propeller pitch.

The crosshead 28 is moved by a drive device, usually a hydraulic piston (not shown), which is located either in the propeller hub 22 or within the hull. Regardless of the type of drive device that moves the crosshead, a translating member 30 in the form of a rod or tube extends forward from the hub through the shaft 12 into the hull 14. The translating member 30 may, depending on the type of CPP system, be a valve rod, which serves the dual purposes of conducting oil to the actuating piston of the pitch control mechanism in the hub and controlling a valve in the hub, an oil supply tube for conducting oil to a piston in the hub under the control of a remote valve within the vessel hull, or a force rod for mechanically moving the crosshead 28. The forward end of the translating member 30 is coupled to a pitch control mechanism 32, which may be a control valve, an 0.D. box, or a mechanical or hydraulic linear motor, depending upon the type of CCP system.

A rigid tube 34 is affixed to the aft end portion of the hub 22 and extends forwardly through the crosshead 28, the translating member 30 and the pitch control mechanism 32 to a location forward of the forward terminus of the propeller shaft. (Ordinarily, the translating member 30 is supported at intervals within the shaft 12 by spiders; and likewise the tube 34 should be supported within the translating member 30.) The forward terminus of the tube will also, preferably, be forward of the gear box (not shown). The tube 34 rotates with the propeller shaft but is longitudinally stationary. In military vessels equipped with a prairie air system, the tube 34 may be the prairie air tube.

Figure 3:
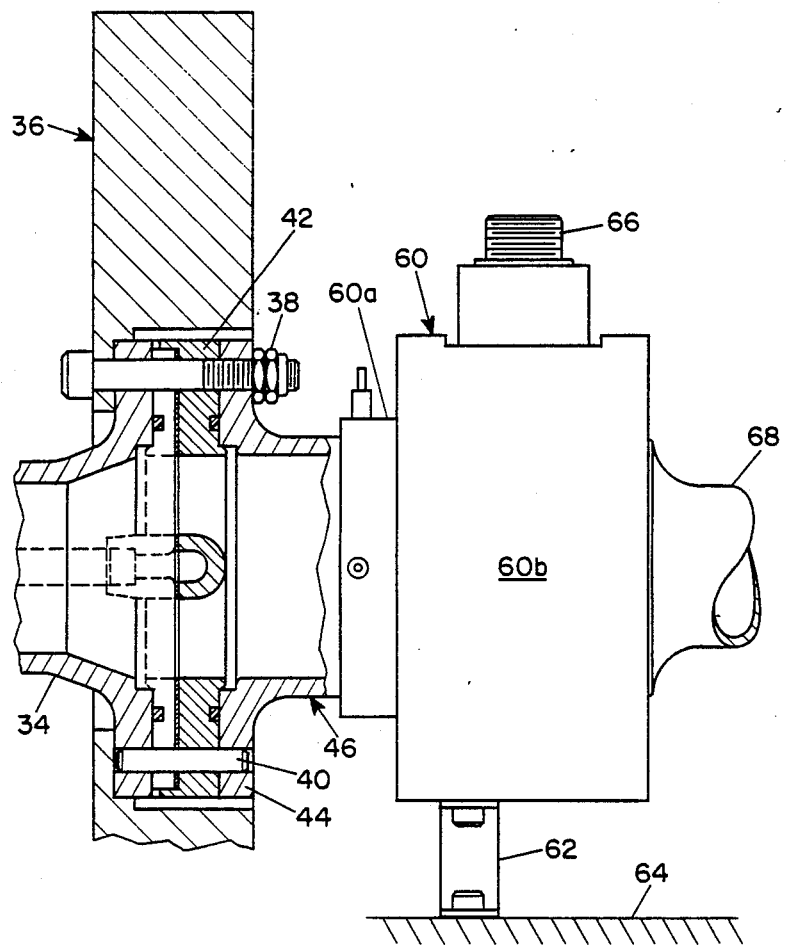
FIG. 3 is a side elevational view of the transformer and rotating circuit housing of the embodiment, the circuit housing being broken away in cross section.
Figure 4:
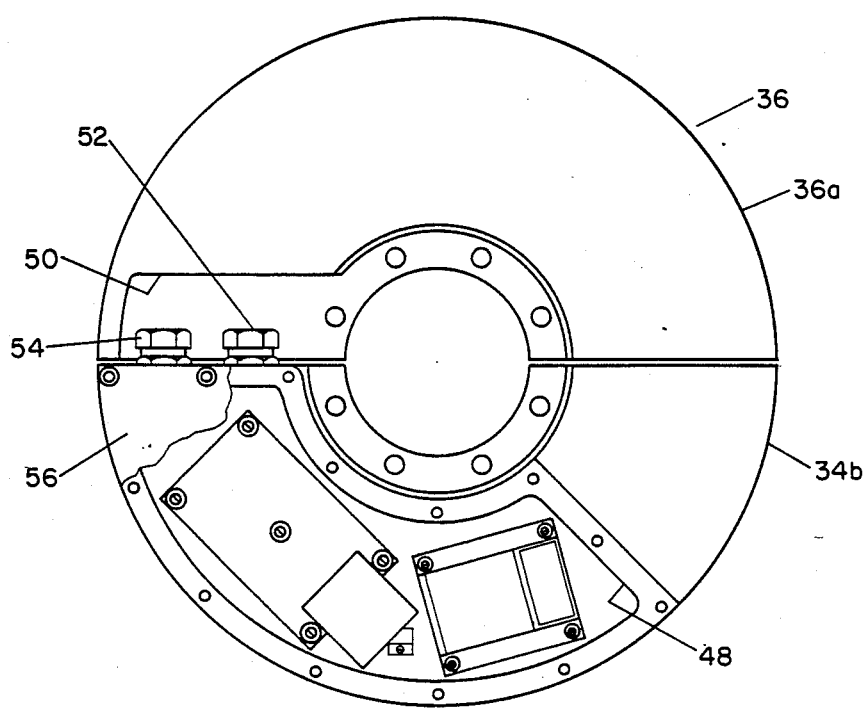
FIG. 4 is a front elevational view of the rotating circuit housing, part of the cover being broken away.

A housing 36 (see FIG. 3) in the form of a relatively thick circular cylinder with substantially planar faces is attached by bolts 38 and pins 40 to the forward end of the tube 34. The housing 36 is made in two pieces 36a and 36b (see FIG. 4) to facilitate assembly and disassembly and is built into a coupling between the tube 34, a wire carrier 42 and a flange portion 44 of a coupling 46. As shown in FIGS. 3 and 4, the housing components are solid metal hogged out to provide a compartment 48 for the two rotating circuits of the pitch detection apparatus (described below) and a passageway 50 for leading conductors to and from the compartment 48 through sealed ports 52 and 54. A removable, sealed cover plate 56 fits over the compartment 48.

Attached to the coupling 46 is a two-channel rotary transformer 60 (FIG. 3). A suitable transformer is commercially available from S. Himmelstein and Company, 2490 Pembroke Avenue, Hoffman Estates, Ill. 60195, U.S.A. The rotor 60a of the transformer is fastened to the coupling 46, and the stator body 60b is restrained against rotation by a coupling 62 fastened to a frame or bed 64. The transformer 60 has a connector 66 for the leads of the stationary coils. In a vessel equipped with a prairie air system, the air passage continues forward from the transformer through a tube section 68. Otherwise, the tube 34 terminates at the assembly comprising the housing 36 and transformer 60.

Figure 2:
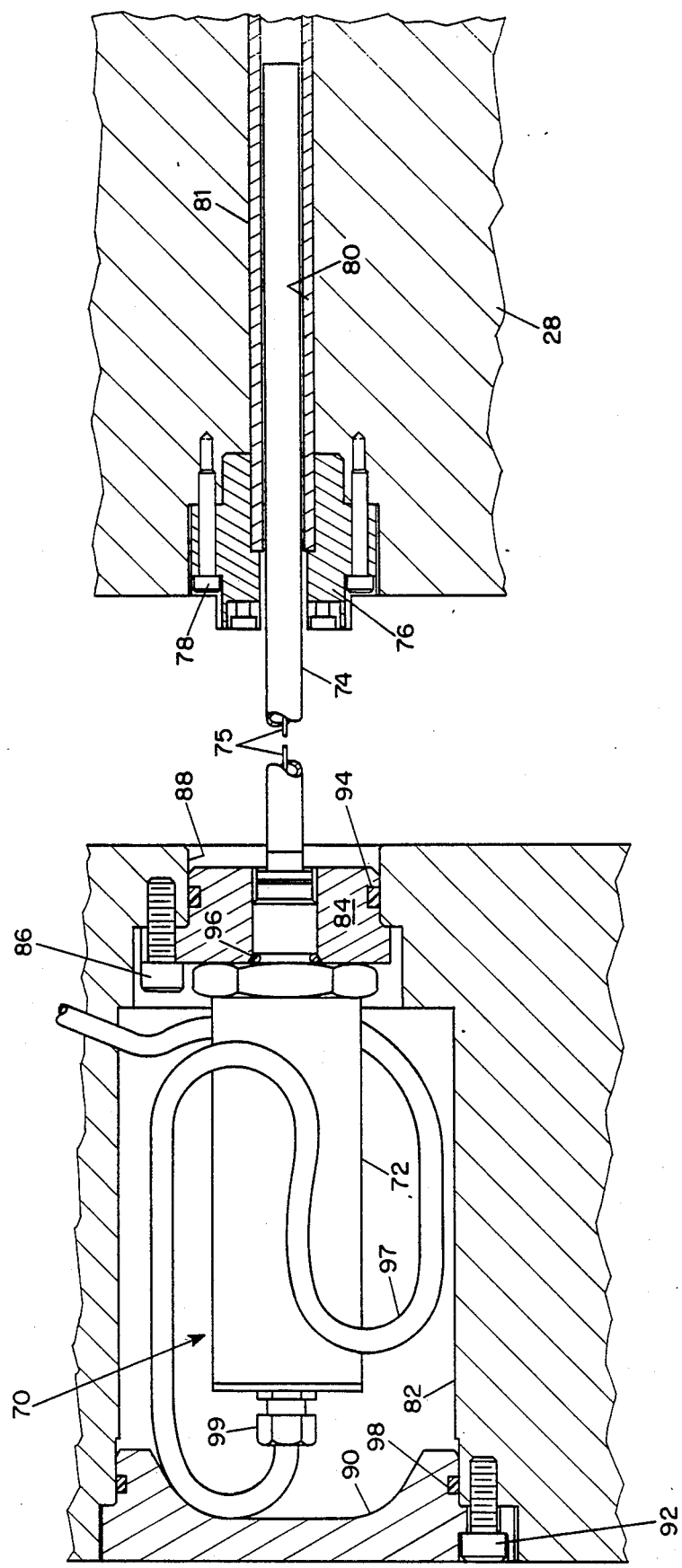
FIG. 2 is a fragmentary cross-sectional view of the transducer of the embodiment as installed in a hub and blade assembly.

As shown schematically in FIG. 1 and in detail in FIG. 2, a linear displacement transducer 70 is installed in the hub 22. The transducer 70 is of a type that operates without any physical contacts between relatively moving parts and is supplied by Balluff, Inc., P.O. Box 937, 8125 Holton Drive, Florence, KY. 41042, U.S.A. The stationary component consists of a housing 72 containing electronic components, a tubular waveguide 74 of magnetostrictive material and an electrical conductor 75 extending through the waveguide. It is energized by DC power and produces periodic current pulses, which are conducted along the conductor 75. The waveguide 74 extends through a magnetic ring 76 that is fastened by screws 78 to the crosshead 28 of the hub and blade assembly. In CPP systems in which the hub and blade assembly includes a hydraulic servo motor in the hub aft of the crosshead, the ring 76 is mounted on the piston rod. The crosshead (or piston rod) has a bore 80 partway through it to accept the waveguide 74 throughout its range of motion. A guide tube 81 for facilitating installation is assembled onto the magnetic ring and extends into the bore 80.

The magnetic field of the ring 76 induces by magnetostriction in response to each current pulse a torsional ultrasonic mechanical pulse, which is propagated along the rod back to the housing and is converted by a sensing transducer component to an electrical signal. The time between the generation of the triggering current pulse and the sensing of the magnetostrictively generated mechanical pulse is a function of the distance between the magnetic ring and the sensing transducer component. The linear displacement transducer 70 produces a DC output signal indicative of the time and, hence, of the position of the crosshead relative to the hub. The propeller pitch is established by the position of the crosshead (or servo piston), so the output signal of the transducer is indicative of the propeller pitch.

Mechanically, the housing component 72 of the transducer 70 (FIG. 2) is received in a compartment 82 formed in the aft wall portion of the hub 22 and open externally. The transducer 70 is threaded onto an adapter fitting 84 that is attached by screws 86 in an opening 88 in the hub wall. A cover 90 is fastened by screws 92 to the hub. 0-ring seals 94, 96, 98 isolate the compartment 82 from the water outside the hub and the grease or oil inside the hub. There is a clearance between the waveguide 74 and the magnetic ring 76, so there is no physical contact between them. The conductors for energizing the transducer and carrying the transducer output signal are elements of a cable 97 that is coupled by a sealed port 99 to the transducer. The cable 97 is led to and through the tube 34 and is connected to the rotating circuits in the housing 36.

Within the vessel hull, as shown diagramatically in FIG. 1, are stationary circuits, a power source, controls and pitch readouts. FIG. 5 is a complete circuit diagram for the embodiment. For clarity, the circuitry will be explained by tracing the path of a signal through the device rather than explaining each main component separately. The voltage, power and frequency values are exemplary values; the present invention is by no means limited to those values.

The apparatus is powered by an external 28 vdc power source 106. Internal to a stationary circuit 101 is a 25 watt +/−15 vdc converter 107 powered by the 28 vdc external source 106. The converter 107 serves three functions: first, it reduces noise in the system by isolating the grounding and the shielding arrangements from the external source; second, it powers a regulated 5 vdc source 107a that can be used for powering the digital circuitry in the system; third, it provides a +15 vdc and a −15 vdc source for the analog circuitry in the system.

The stationary circuit 101 must generate a signal that is transferrable to a rotating circuit 103, i.e., an AC signal. Accordingly, the stationary circuit 101 converts the 28 vdc signal into an AC signal by utilizing a 10 khz square wave oscillator 108. The square wave output of the oscillator 108 is then transformed into a zero-centered, sinusoidal signal by a filter/zero offset sub-component 109 of the stationary circuit 101. After the signal is amplified by two power amplifiers 110, 111, this first AC signal on conductors 112 is capable of driving one channel of the rotary transformer 60.

The first AC signal on conductors 112 is transferred via the first channel 102a of the rotary transformer 60 to a rectifier/regulator 113 in the rotating circuit 103. Here, the first AC signal is rectified and converted into a regulated 24 vdc signal. This first DC signal has two functions. First, it supplies excitation to the linear displacement transducer 105. Second, it supplies power via conductor 114 to a +/−15 vdc converter. This second converter 115 powers the rest of the sub-components in the rotating circuit 103.

The first DC signal output of the rectifier/ regulator 113 powers the linear displacement transducer 70 via a conductor pair of the cable 97 that runs aft through the tube 32. The linear displacement transducer 105 uses the first DC signal to generate the current pulse, to detect the return mechanical pulse and to produce a DC output signal indicative of the position of the magnetic ring 76 relative to the waveguide 74 and thus of the propeller pitch. This DC output signal from the transducer, which will be referred to as the second DC signal, is conducted along conductors 117 in the cable 97 to the rotating circuit 103. A 3 khz oscillator 118 in the rotating circuit 103 generates a ground-centered square wave that strobes a modulator 119 also in the rotating circuit 103. Both sub-components are powered by the second converter 115. The second DC signal is transformed by the modulator 119 into an amplitude modulated square wave voltage signal. This signal passes through a filter 120 powered by the second converter 115 to an excitation driver 121. The output signal of the driver 121 is a current driving amplitude modulated signal, the "second AC signal," capable of driving the current winding in the second channel 102b of the rotary transformer 60. This signal is proportional to the second DC signal and consequently is still indicative of the pitch setting of the blades. From the rotary transformer 60, the second AC signal on the conductor 122 enters a rectifier/filter 124 in the stationary circuit 101. The rectifier/filter 124, powered by the first converter 107 transforms the second AC signal to a third DC signal on the conductor 125. The rectifier/filter 124 uses a precision feedback, low dead band circuit. Such circuits are in common use. The output of the rectifier/filter 124 enters the pitch programmer 126.

The pitch programmer 126, a sub-component of the stationary circuit 101, transforms its input signal to an output signal, in this embodiment, directly proportional to the pitch setting of the blades. The pitch programmer 126 includes a 5.7 khz oscillator 127, an edge shaper 128, an analog to digital converter 129, two memory EPROMs 130, 131 and a digital to analog converter 132. The digital components are powered by the 5 vdc source 107a. The 5.7 khz oscillator 127 generates a ground based square wave. The edge shaper 128 has a NAND gate which sharpens the edges of the square wave. This output provides the timing for the digital circuitry by strobing the analog to digital converter 129.

The rectified third DC signal 125 is converted by the analog to digital converter 129 to a ten bit digital word. This word becomes the address for the pair of eight bit EPROM memory devices 130, 131. These memory devices 130, 131 can be programmed, using an EPROM programmer, so that the EPROM output of the memory devices 130, 131 has a different relationship from the EPROM input of the memory devices 130, 131. In this embodiment, the EPROM input signal is nonlinearly indicative of the pitch setting of the blades (because the crank pins of the blades rotate through arcs in response to linear movements of the crosshead and the pitch is therefore a trigonometric function of movements of the crosshead) while the EPROM output signal is linearly related to the pitch setting of the blades. The EPROM output, a ten bit digital word, is then converted to an analog signal by the digital to analog converter 132.

From the above-described signal manipulation, the EPROM input signal can be characterized at the EPROM output in any relationship required. The resolution of the characterization is only dependent on the number of bits chosen for the converters and memory. Currently, twelve bit resolution is state of the art. The analog signal output of the digital to analog converter 132 is then readied by conditioning amplifiers 133 to drive control systems or readouts 134 as required.

I claim:

1. Apparatus for detecting the pitch of a marine controllable pitch propeller system that includes rotatable propeller shaft extending from within a vessel hull to a location outboard of the hull, a hub and blade assembly affixed to the shaft at said outboard location and having a plurality of blades mounted on a hub to pivot about axes disposed generally radially of the propeller shaft axis, and pitch-control means including a translating member located in the hub and coupled to the blades for changing the pitch settings of the blades in response to fore-and-aft movements of the translating member, comprising a stationary circuit in the vessel hull including means for generating a first AC signal, first rotary electrical transformer means in the vessel hull and including a stationary winding connected to the stationary circuit for receiving the first AC signal and a rotating winding rotatable with the propeller shaft for receiving the first AC signal from the rotating winding, thereby to transfer the first AC signal with no physical contact between relatively movable components, a first rotating circuit means rotatable with the propeller shaft for converting the first AC signal to a first DC signal, linear displacement transducer means received in the propeller hub and connected to the first rotating circuit for energization thereby for detecting the fore-and-aft position of the translating member without any physical contacts between relatively moving components of the transducing means and for converting the first DC signal to a second DC signal indicative of the position of the translating member, second rotating circuit means rotatable with the shaft and connected to the transducer means to receive the second DC signal for converting the second DC signal to a second AC signal, second rotary electrical transformer means within the vessel hull including a rotating winding rotatable with the propeller shaft and connected to the second rotating circuit means to receive the second AC signal and a stationary winding for receiving the second AC signal from the rotating winding without physical contacts of relatively moving components, and second stationary circuit means in the vessel hull connected to the stationary winding of the second transformer means to receive the second AC signal for processing the second AC signal and producing readout and control signals indicative of the pitch-setting of the hub and blade.

2. Apparatus according to claim 1 wherein the linear displacement transducer means includes a stationary component affixed to the propeller hub and a movable component affixed to the translating member, the stationary component including an electrical conductor and a magnetostrictively conducting waveguide and the movable component including permanent magnets adapted to generate a magnetic field for propagating magnetostrictively an ultrasonic mechanical pulse along the waveguide induced by a current pulse generated by circuit means of the stationary component energized by the first DC signal and conducted along the conductor of the waveguide.

3. Apparatus according to claim 1 wherein the first and second rotary transformer means are components of a unitary two-channel rotary transformer.

4. Apparatus according to claim 1, and further comprising a rigid conduit running aftward within the propeller shaft from a location within the vessel hull forward of a forward terminus of the shaft to a location within the propeller hub, the conduit being rotatable with the propeller shaft and axially fixed, and wherein the first and second rotary transformer means and the first and second rotating circuit means are affixed to the conduit forward of the forward terminus of the propeller shaft.

5. Apparatus according to claim 4 and further comprising electrical conductors adapted to conduct the first and second DC signals between the transducer means and the respective stationary circuits and extending through the conduit.

6. Apparatus according to claim 4 and further comprising a housing affixed to the outside of the conduit forward of the forward terminus of the propeller shaft and containing the first and second rotating circuit means.

7. Apparatus according to claim 6 wherein the housing has substantially planar fore-and-aft faces and a circular cylindrical peripheral wall concentric to the axis of rotation of the conduit.

8. Apparatus according to claim 2 wherein the stationary component of the transducer is contained in a compartment formed in an aft wall portion of the hub, wherein the waveguide extends forwardly from the compartment through a sealed opening, and wherein the compartment has an external access opening in the hub aft wall portion covered by a removable sealed cover.

* * * * *